United States Patent
Wu et al.

(10) Patent No.: US 6,729,778 B1
(45) Date of Patent: May 4, 2004

(54) FIXTURE FOR FIXING CAMERA AND THE LIKES CAPABLE OF ADJUSTING THE PITCHING ANGLE OF THE CAMERA

(76) Inventors: Shing Ming Wu, No. 13-3, Sansing St., Dali City, Taichung County (TW); Steven Yung, No. 58, 1st Chang-Ching St., North Dist., Taichung (TW)

( * ) Notice: Subject to any disclaimer, the term of this patent is extended or adjusted under 35 U.S.C. 154(b) by 0 days.

(21) Appl. No.: 10/603,314

(22) Filed: Jun. 24, 2003

(51) Int. Cl.$^7$ ................................................ G03B 17/00
(52) U.S. Cl. ...................... 396/428; 248/682; 248/181.1
(58) Field of Search ................................ 396/419, 428; 248/682, 177.1, 181.1

(56) References Cited

U.S. PATENT DOCUMENTS 4,526,308 A * 7/1985 Dovey ........................ 396/420
5,927,681 A * 7/1999 Ovelman ..................... 396/428
6,254,044 B1 * 7/2001 Lee ............................ 248/181.1

* cited by examiner

Primary Examiner—David M. Gray
(74) Attorney, Agent, or Firm—Charles E. Baxley

(57) ABSTRACT

A fixture for fixing camera and the likes which is capable of adjusting the pitching angle of the camera and generally comprises a coupling device, an universal joint, a platform, a fixing member and a locking assembly. Wherein the coupling device is provided with concave gaps so as to engage with strip-shape objects, by virtue of the fixing member together with locking assembly the platform is able to revolve round the universal joint, thereby the camera fixed on the platform can be vertically, laterally or even irregularly adjusted according to the user's needs.

6 Claims, 6 Drawing Sheets

FIXTURE FOR FIXING CAMERA AND THE LIKES CAPABLE OF ADJUSTING THE PITCHING ANGLE OF THE CAMERA

BACKGROUND OF THE INVENTION

1. Field of the Invention

The present invention relates to a fixture for fixing camera or the likes, and more particularly to a fixture being capable of adjusting the pitching angle of the camera.

2. Description of the Prior Arts

At present, there are many varieties of fixtures for fixing camera and the likes, which varies from one-foot stand, G-shaped stand to tripod, the common feature of these conventional fixtures is that it needs to be placed on a flat surface and can not be fixed to a strip-shaped object, thereby it obviously lacks of applicability. In addition, the camera or the likes which fixed to the conventional fixture only can be single-axially adjusted (crosswise), the vertical adjustment of which should be relied on the falling and rising adjustment of the stand (fixture). After the stand is fixed, the pitching angle of the camera on it cannot be adjusted anymore, thereby it is inconvenient for using.

The present invention has arisen to mitigate and/or obviate the afore-described disadvantages of the conventional fixture for fixing camera and the likes.

SUMMARY OF THE INVENTION

In accordance with one aspect of the present invention, there is provided with a fixture for fixing camera and the likes which is capable of adjusting the fixing angle and generally comprising: a coupling device, an universal joint, a platform, a fixing member and a locking assembly. Wherein the coupling device is provided with concave gaps so as to engage with strip-shape objects, by virtue of the fixing member together with locking assembly the platform is able to revolve round the universal joint, thereby the camera fixed on the platform can be vertically, laterally or even irregularly adjusted according to the user's needs.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENT

Figure 1:
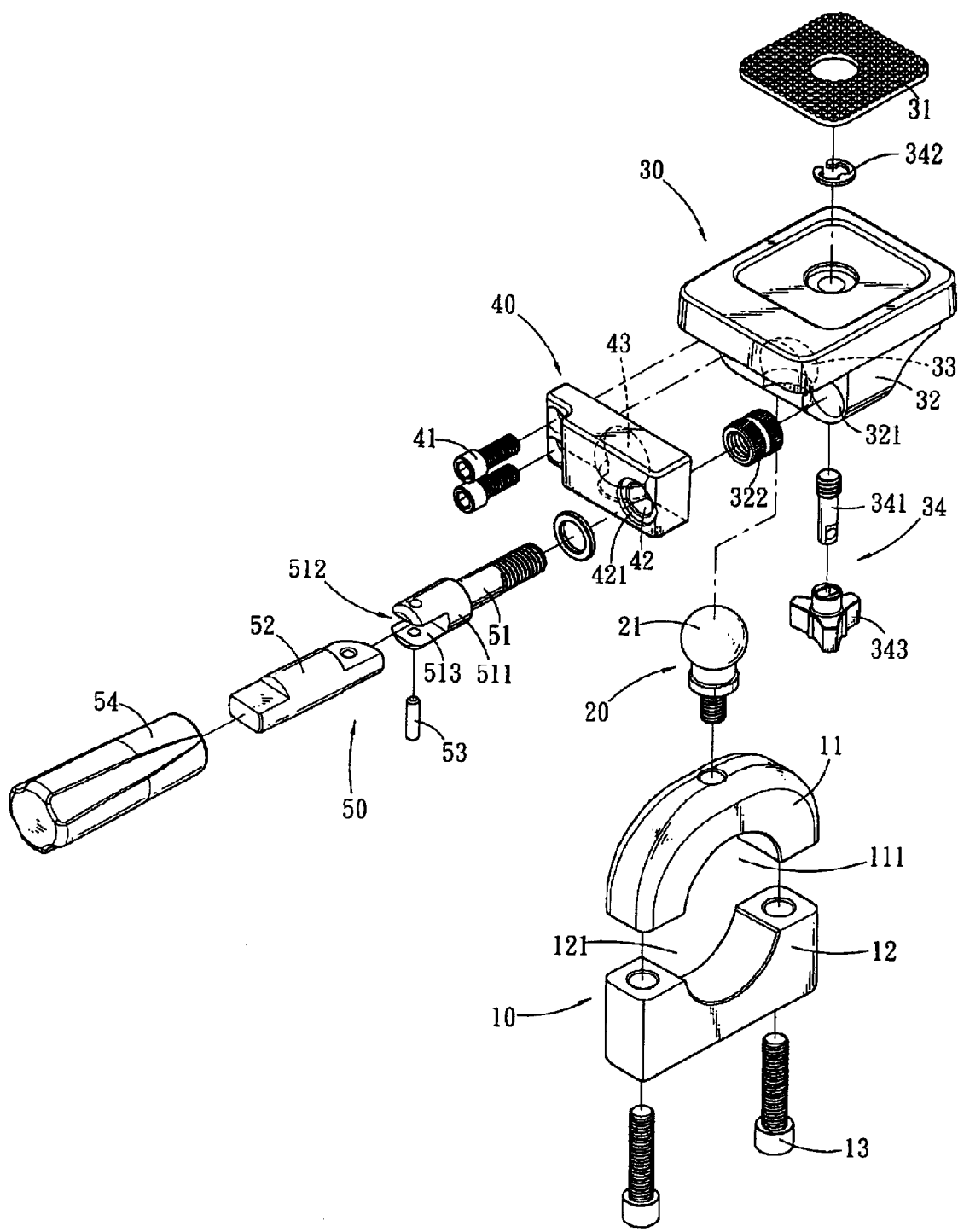
FIG. 1 is an exploded view of a fixture for fixing camera and the likes in accordance with the present invention.
Figure 2:
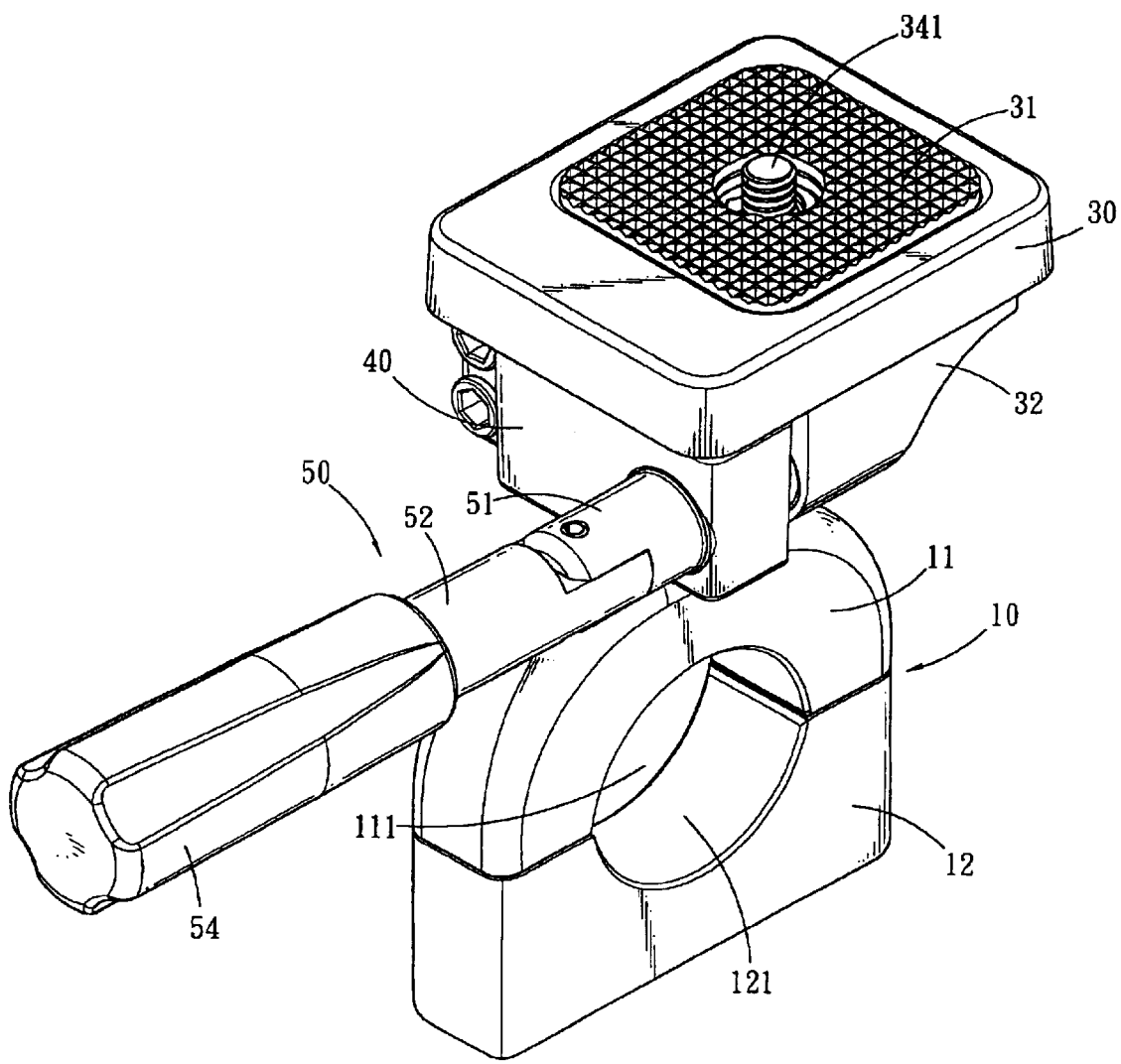
FIG. 2 is a perspective view of the fixture for fixing camera and the likes in accordance with the present invention.

Referring to FIGS. 1–2, a fixture for fixing camera and the likes in accordance with the present invention generally comprises a coupling device 10, an universal joint 20, a platform 30, a fixing member 40 and a locking assembly 50.

The coupling device 10 includes a first coupling member 11 and a second coupling member 12, both of which are integrally connected together by virtue of bolts 13. The first and the second coupling members 11, 12 are provided with a curved gap 111, 121 respectively for receiving stripe-shaped objects there between.

The universal joint 20 has a first end fixed to the first coupling member 11 of the coupling device 10 and a second end of which is a head portion which is spherical-configured.

The platform 30 is provided at a surface of an end with an antiskid member 31 and at another end surface of the same a coupling portion 32 is defined. The coupling portion 32 has a recess 321 formed thereof for the receipt of a tightener 322, contiguous to recess 321 a semi-spherical cavity 33 is formed for receiving part of the head portion 21 of the universal joint 20. Furthermore, an engaging device 34 is disposed adjacent to the coupling portion 32 which inserting through the platform 30. The engaging device 34 includes an engaging rod 341, a C-shape retainer ring 342 and knob 343, which rotatably passes through the platform 30 with an end protruding out of the antiskid member 31 and fixed at a side of the platform 30 by virtue of the C-shape retainer ring 342. Another end of the engaging rod 341 also protrudes out of the platform 30 and be fixed at another side of the same by virtue of the knob 343. The engaging rod 341, on which, is provided for fixing a video camera or the likes.

The fixing member 40 has a first end fixed to the coupling portion 32 of the platform 30 by virtue of bolts 41, a second end of which is provided with a through hole 42 having a flange 421 formed on the internal surface thereof. Proximate to the center of the fixing member 40 thereof is formed with a semi-spherical cavity 43 for receiving part of the head portion 21 of the universal joint 20, such that the head portion 21 of the universal joint 20 may be received between the semi-spherical cavity 43 of the fixing member 40 and the semi-spherical cavity 33 of the platform 30, and meanwhile, the platform 30 will be revolvable round the universal joint 20.

The locking assembly 50 includes a locking rod 51 and foldable rod 52. The locking rod 51 has a first end for inserting through the through hole 42 of the fixing member 40 and screwing in the tightener 322 of the platform 30 and a second end defined with an abutting portion 511, the end surface of the abutting portion 511 is corresponding to the flange 421 of the through hole 42. In the abutting portion 511 thereof a notch 512 is defined. The foldable rod 52 has an end inserted in the notch 512 by passing a pin 53 through the internal surface 513 and the foldable rod 52, such that the foldable rod 52 can be foldable along the notch 512. Furthermore, the foldable rod 52 may be covered with a sleeve 54 for facilitating holding.

Figure 3:
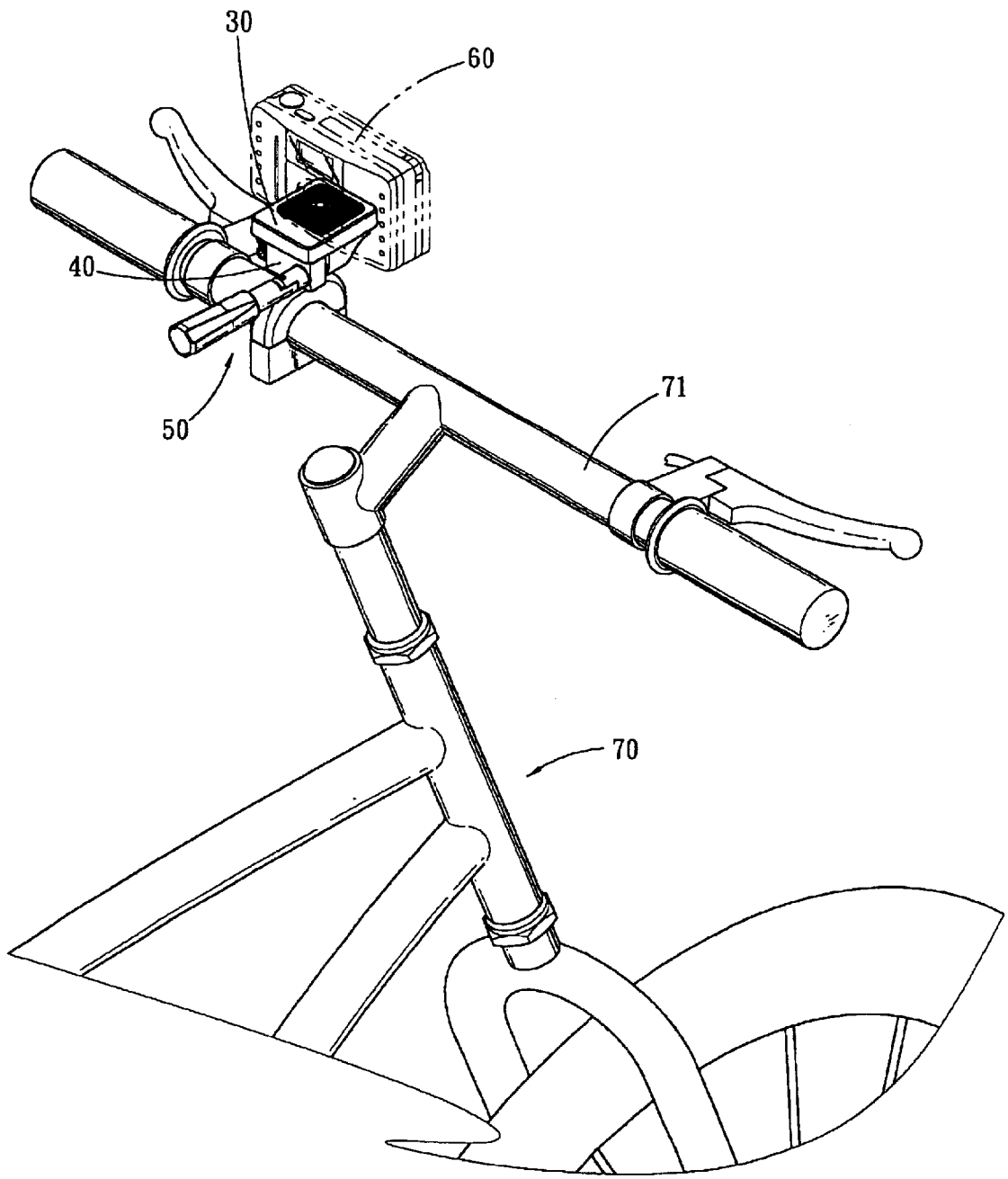
FIG. 3 is a perspective view of showing the fixture for fixing camera and the likes of the present invention being fixing to the handlebar of a bike.
Figure 4:
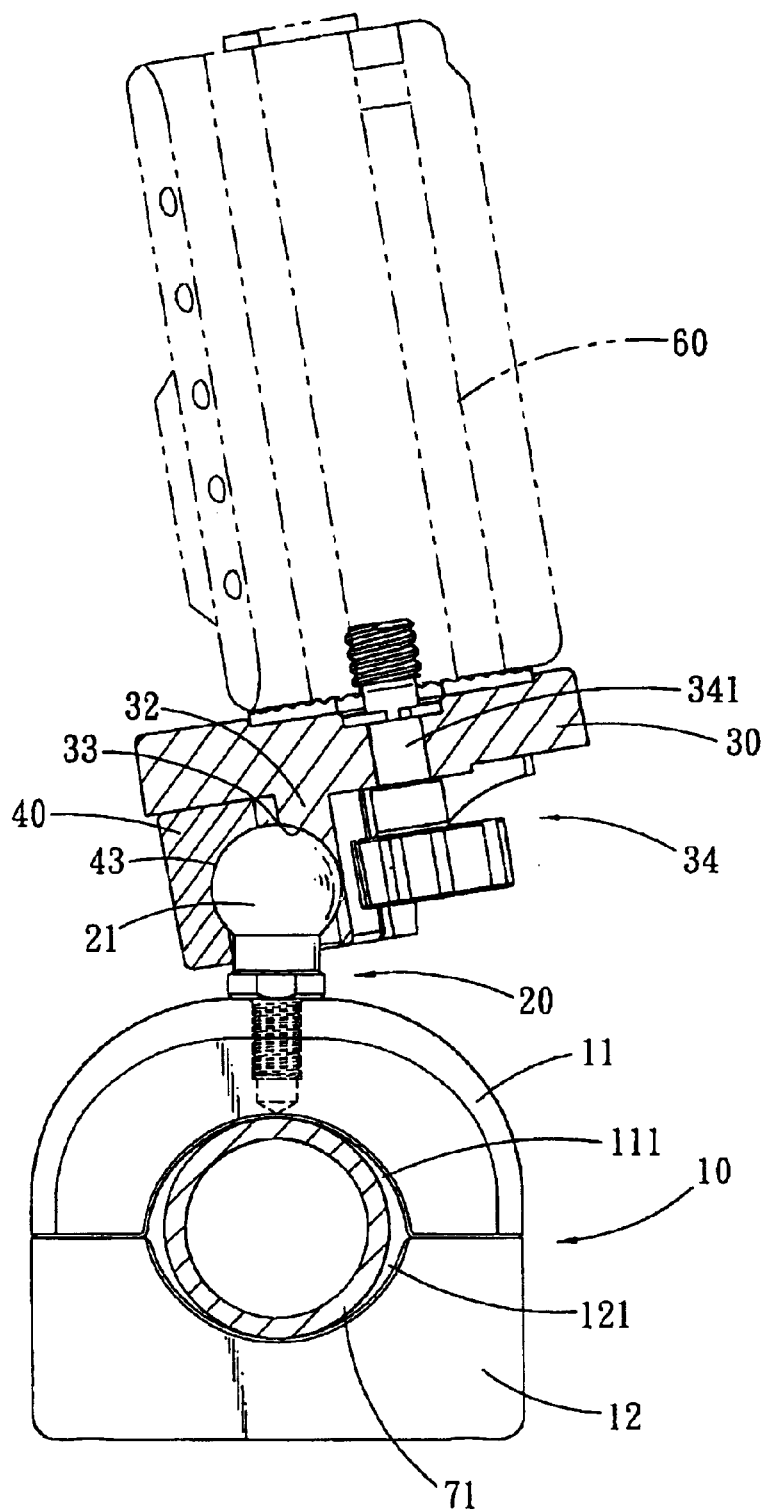
FIG. 4 is a cross sectional view of the fixture for fixing camera and the likes of the present invention.
Figure 5:
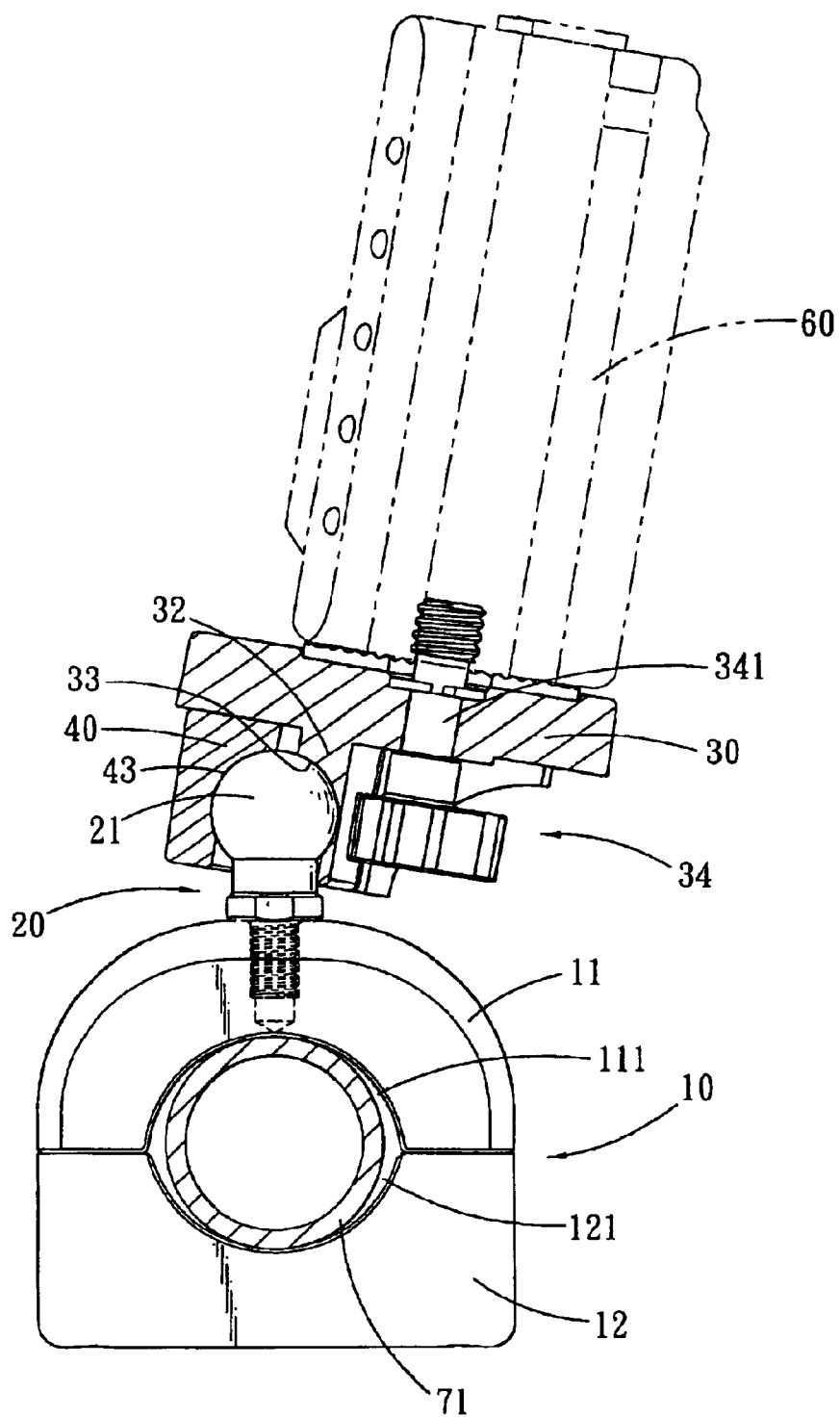
FIG. 5 is another cross sectional view of the fixture for fixing camera and the likes of the present invention.

Referring further to FIGS. 3–5, wherein the engaging rod 341 serves for fixing camera 60 while the curved gap 111, 121 of the first and second coupling member 11, 12 of the coupling device 10 are employed to engaging with a handle-bar 71 of the bike 70. To adjust the shoot angle of the camera 60, the locking assembly 50 needs to be loosened initially, so as to loosen the tightness among the head portion 21 of the universal joint 20, the semi-spherical cavity 33 of the platform 30 and the semi-spherical cavity 43 of the fixing member 40. In other words, the platform 30 and the head portion 21 of the universal joint 20 are engaged with each other. The user then can adjust the shoot angle of the camera 60 as needs. After adjustment, the locking assembly 50 should be locked so as to tighten the combination between the coupling portion 32 of the platform 30 and the fixing member 40, meanwhile, firmly clamping the head portion 21 of the universal joint 20, such that the platform 30 is fixed. Thereby, based on the same operation way and together with the head portion 21 of the universal joint 20, the platform 30 can be vertically, laterally and even irregular direction adjusted.

On the other hand, since the fixture of the present invention can be fixed to rod members, such as handlebar of bikes, cross rod of glider and so on, the camera is able to take photo in action according to user's needs.

Figure 6:
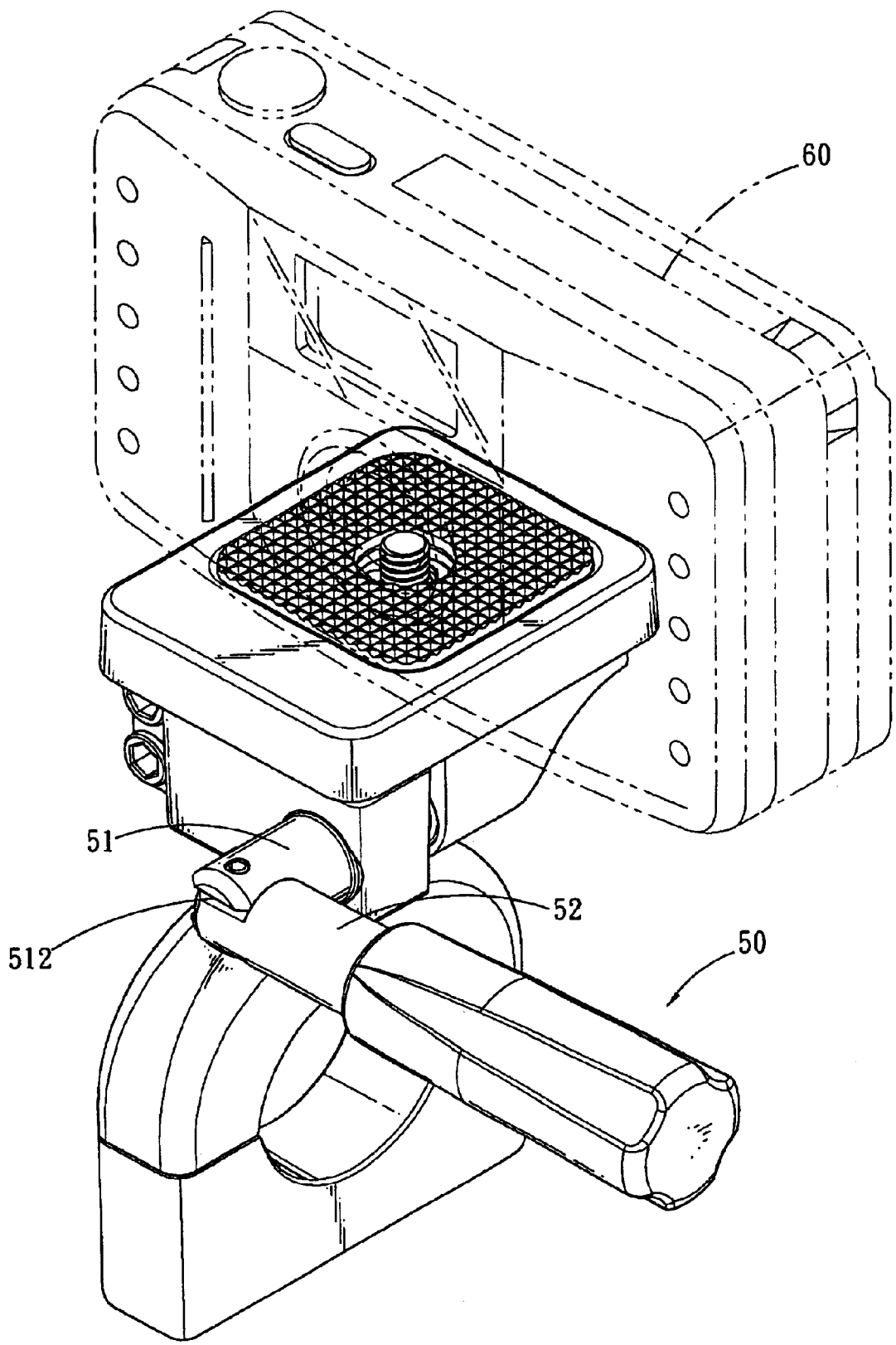
FIG. 6 is an illustrative view of showing the fixture for fixing camera and the likes of the present invention after its foldable rod being folded.

It will be noted that, with reference to FIG. 6, after the adjustment of the shoot angle of the camera 60, the locking assembly 50 is locked. Since the foldable rod 52 of the locking assembly 50 may be foldable along the notch 512 of the locking rod 51, the foldable rod 52 can be folded so as to save space after the locking assembly 50 is locked.

While we have shown and described various embodiments in accordance with the present invention, it should be clear to those skilled in the art that further embodiments may be made without departing from the scope of the present invention.

What is claimed is:

1. A fixture for fixing camera and the likes capable of adjusting the pitching angle of the camera comprising:
    a coupling device capable of coupling to stripe-shape objects;
    an universal joint having a first end fixed to the coupling device and a second end formed with head portion;
    a platform having a coupling portion, in which a cavity formed for receiving part of head of the universal joint, an engaging device inserted through the platform for fixing camera or the likes;
    a fixing member provided with a cavity and to be fixed to the coupling portion of the platform, whereby the head of the universal joint can be received between the cavity of the platform and that of the fixing member, so as to enable the platform to revolve round the universal joint;
    a locking assembly disposed between the coupling portion of the platform and the fixing member, whereby to fix the platform to the universal joint after the locking assembly is locked.

2. The fixture for fixing camera and the likes capable of adjusting the pitching angle of the camera as claimed in claim 1, wherein the coupling device includes a first and a second coupling member, both of which are provided with an curved gap respectively for receiving strip-shape object therebetween.

3. The fixture for fixing camera and the likes capable of adjusting the pitching angle of the camera as claimed in claim 1, wherein the head of the universal joint is spherical formed, the cavity of the platform and that of the fixing member are semi-sphere shaped.

4. The fixture for fixing camera and the likes capable of adjusting the pitching angle of the camera as claimed in claim 1, wherein the engaging device includes an engaging rod, a C-shape retainer ring and a knob, the engaging rod rotatably inserts through the platform, which has an end fixed by a C-shape retainer ring and another end fixed by the knob.

5. The fixture for fixing camera and the likes capable of adjusting the pitching angle of the camera as claimed in claim 1, wherein the locking assembly includes a locking rod and a foldable rod, a first end of the locking rod is disposed between the coupling portion of the platform and the fixing member, a second end of the same is defined with a notch for engaging with the foldable rod, such that the foldable rod can be folded along the notch.

6. The fixture for fixing camera and the likes capable of adjusting the pitching angle of the camera as claimed in claim 5, wherein the foldable rod of the locking assembly can be covered by a sleeve.

\* \* \* \* \*